US012803396B2

(12) United States Patent
Taguri

(10) Patent No.: US 12,803,396 B2
(45) Date of Patent: Nov. 17, 2026

(54) REMAINING LIFE ESTIMATION DEVICE FOR POWER CONVERTER

(71) Applicant: TOYOTA JIDOSHA KABUSHIKI KAISHA, Toyota (JP)

(72) Inventor: Kento Taguri, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 460 days.

(21) Appl. No.: 18/491,116

(22) Filed: Oct. 20, 2023

(65) Prior Publication Data

US 2024/0204627 A1 Jun. 20, 2024

(30) Foreign Application Priority Data

Dec. 14, 2022 (JP) ................................ 2022-199486

(51) Int. Cl.
*H02K 11/35* (2016.01)
*G01K 13/02* (2021.01)

(52) U.S. Cl.
CPC ........... *H02K 11/35* (2016.01); *G01K 13/026* (2021.01)

(58) Field of Classification Search
CPC ...... H02K 11/35; G01K 13/026; G01K 13/00; G01R 31/00; G06F 30/20; G06F 2119/04; G06F 2119/08; G06F 2119/12
See application file for complete search history.

(56) References Cited

U.S. PATENT DOCUMENTS

2003/0185271 A1 10/2003 Isozumi et al.
2022/0077752 A1 3/2022 Iezawa et al.

FOREIGN PATENT DOCUMENTS

| | | | | | |
|---|---|---|---|---|---|
| CN | 118194500 | A | * | 6/2024 | ............ G06F 30/20 |
| DE | 102004035723 | A1 | * | 2/2006 | ........... H02M 5/458 |
| JP | 08322141 | A | * | 5/1995 | |
| JP | 2003-243269 | A | | 8/2003 | |
| JP | 2004317805 | A | * | 11/2004 | |
| JP | 2011119428 | A | * | 6/2011 | |
| JP | 2013080787 | A | * | 5/2013 | |
| JP | 2017108546 | A | * | 6/2017 | |
| JP | 2017143647 | A | * | 8/2017 | ............ H02P 27/08 |

(Continued)

OTHER PUBLICATIONS

DE-102004035723-A1_translated (Year: 2006).*

(Continued)

*Primary Examiner* — Catherine T. Rastovski
*Assistant Examiner* — Michael J Singletary
(74) *Attorney, Agent, or Firm* — SoraIP, Inc.

(57) ABSTRACT

The remaining life estimation device is a remaining life estimation device of a power converter including a life part accommodated in a case. The remaining life estimation device includes a processor for calculating remaining life information of the life part. The processor calculates a cumulative exposure time for each life part temperature of the life part, converts each cumulative exposure time into a converted cumulative exposure time by reflecting a life conversion coefficient to each cumulative exposure time calculated for each life part temperature, and calculates the remaining life information based on a life reduction time that is a sum of the converted cumulative exposure time for each life part temperature and a reference life time that is a life time of the life part under the reference value.

5 Claims, 4 Drawing Sheets

(56) References Cited

FOREIGN PATENT DOCUMENTS

| | | | |
|---|---|---|---|
| JP | 2021-078300 | A | 5/2021 |
| JP | 7008770 | B1 | 1/2022 |

OTHER PUBLICATIONS

JP-2011119428-A_translated (Year: 2011).*
JP-08322141-A_translated (Year: 1995).*
JP-2017143647-A_translated (Year: 2017).*
JP-2017108546-A_translated (Year: 2017).*
JP-2013080787-A_translated (Year: 2013).*
JP-2004317805-A_translated (Year: 2004).*
CN-118194500-A_translated (Year: 2024).*

* cited by examiner

FIG. 3

| LIFE PART TEMPERATURE Tc | LIFE TIME tL | LIFE CONVERSION COEFFICIENT K2 | COUNT NUMBER | CUMULATIVE EXPOSURE TIMES t1 | CONVERTED CUMULATIVE EXPOSURE TIME t2 | LIFETIME REDUCTION TIME t3 |
|---|---|---|---|---|---|---|
| °C | hour | — | — | hour | hour | hour |
| 25 | 100000 | 0.01 | 252450 | 70.125 | 0.7013 | 2.28 |
| 26 | 99000 | 0.0101 | 232430 | 64.56388889 | 0.6522 | |
| 27 | 97000 | 0.01031 | 223024 | 61.95111111 | 0.6387 | |
| ⋮ | ⋮ | ⋮ | ⋮ | ⋮ | ⋮ | |
| 50 | 10000 | 0.1 | 10234 | 2.842777778 | 0.2843 | |
| ⋮ | ⋮ | ⋮ | ⋮ | ⋮ | ⋮ | |
| 98 | 1800 | 0.5556 | 15 | 0.004166667 | 0.002315 | |
| 99 | 1100 | 0.9091 | 14 | 0003888889 | 0.003535 | |
| 100 | 1000 | 1 | 10 | 0.002777778 | 0.002778 | |

REMAINING LIFE ESTIMATION DEVICE FOR POWER CONVERTER

CROSS-REFERENCE TO RELATED APPLICATION

This application claims priority to Japanese Patent Application No. 2022-199486 filed on Dec. 14, 2022, incorporated herein by reference in its entirety.

BACKGROUND

1. Technical Field

The present disclosure relates to a remaining life estimation device for a power converter.

2. Description of Related Art

Japanese Patent No. 7008770 (JP 7008770 B) discloses a motor drive system. In order to be able to grasp the life of a motor or the life of an inverter outside a vehicle, in the motor drive system, a life predicted value that is life prediction information is calculated based on at least one of carrier frequency, a motor current value, a motor voltage value, and the part characteristics of the inverter, or information obtained by combining a plurality of them.

SUMMARY

In a technique described in JP 7008770 B described above, it is not possible to estimate the remaining life of individual parts constituting the inverter. Therefore, the time of repair or replacement of the power converter may be erroneously determined.

The present disclosure has been made in view of the above-described issues, and an object of the present disclosure is to provide a remaining life estimation device capable of appropriately estimating remaining life information of individual life parts constituting a power converter.

A remaining life estimation device according to the present disclosure is a remaining life estimation device for a power converter including a life part accommodated in a case. The remaining life estimation device includes a processor for calculating remaining life information of the life part. The processor calculates a cumulative exposure time that is a cumulative value of a time for which the life part is exposed to the same temperature during an operation of the power converter for each life part temperature of the life part. The processor converts each cumulative exposure time into a converted cumulative exposure time that is a cumulative exposure time under a reference value of the life part temperature by reflecting a life conversion coefficient to each cumulative exposure time calculated for each life part temperature. Then, the processor calculates the remaining life information based on a life reduction time that is a sum of the converted cumulative exposure time for each life part temperature and a reference life time that is a life time of the life part under the reference value.

According to the present disclosure, it is possible to appropriately estimate the remaining life information of the individual life parts constituting the power converter. Therefore, it is possible to accurately determine the time of repair or replacement of the power converter from the remaining life information of the individual life parts estimated as described above.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing an example of various data used for calculating the remaining life information;

DETAILED DESCRIPTION OF EMBODIMENTS

Embodiments of the present disclosure will be described with reference to the accompanying drawings.

1. Device Configuration

Figure 1:
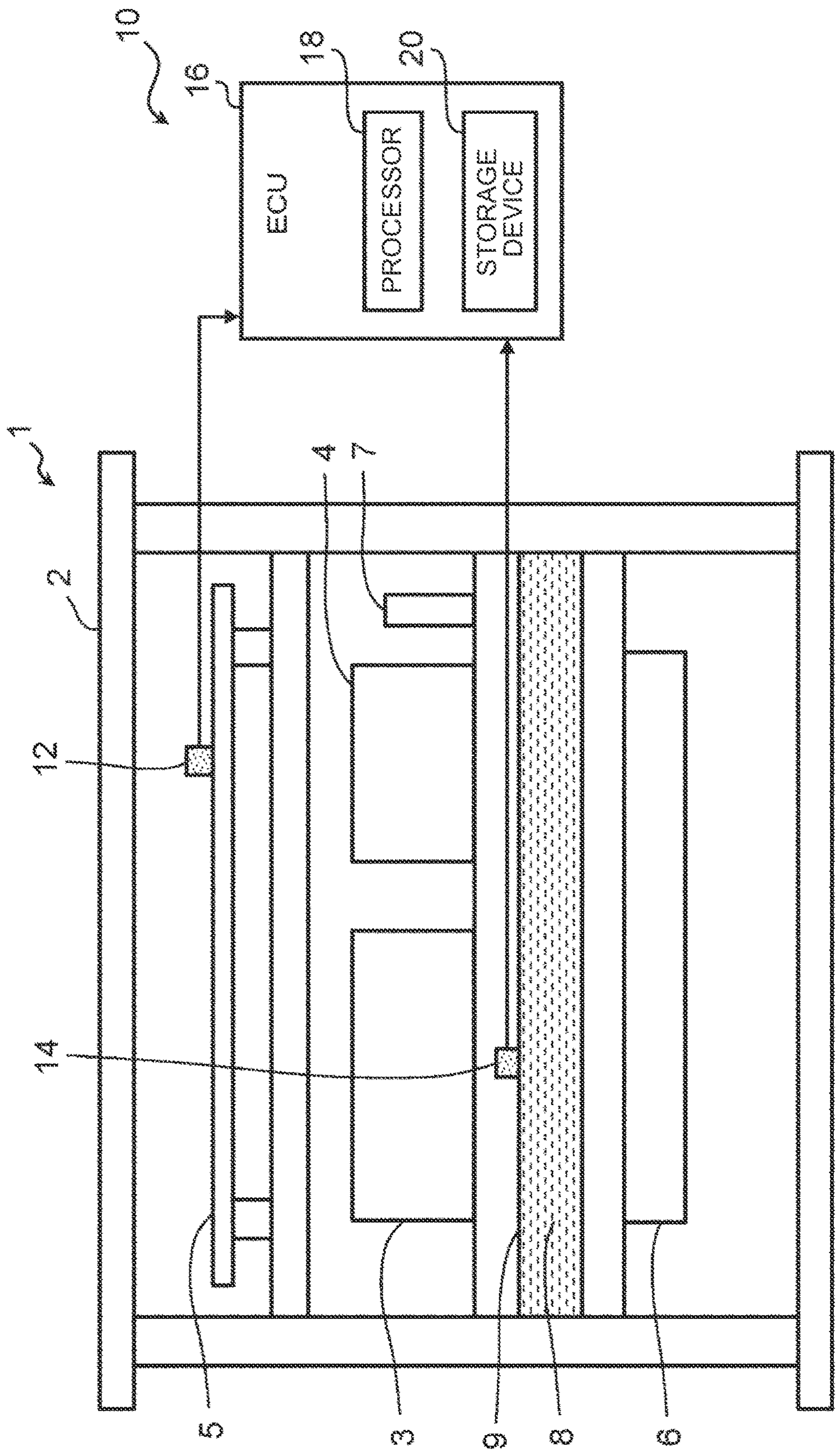
FIG. 1 is a diagram schematically illustrating a configuration of a power converter to which a remaining life estimation device according to an embodiment is applied.

FIG. 1 is a diagram schematically illustrating a configuration of a power converter 1 to which a remaining life estimation device 10 according to an embodiment is applied. The power converter 1 is mounted on a vehicle such as a hybrid electric vehicle (HEV) or a battery electric vehicle (BEV). The power converter 1 is interposed between a battery for traveling in a vehicle and an electric motor. Hereinafter, the power converter 1 is also referred to as a PCU (power control unit) 1.

PCU 1 includes a PCU case 2. In PCU case 2, a plurality of lifetime components constituting PCU 1 are accommodated. The plurality of lifetime components includes, for example, a capacitor 3, a reactor 4, a control board 5, a DC/DC converter 6, and a current sensor 7. A refrigerant flow path 9 through which the refrigerant 8 flows is formed in PCU case 2. The refrigerant 8 is, for example, cooling water (coolant) or oil. More specifically, the condenser 3, the reactor 4, DC/DC converters 6, and the current sensor 7 are cooled by the refrigerant 8 flowing through the refrigerant flow path 9.

The remaining life estimation device 10 includes an ambient temperature sensor 12, a refrigerant temperature sensor 14, and an electronic control unit (ECU) 16. The ambient temperature sensor 12 detects the ambient temperature Ta in PCU case 2. The refrigerant temperature sensor 14 detects a temperature (refrigerant temperature) Tw of the refrigerant 8.

ECU 16 is a computer that calculates the remaining life of each of the plurality of lifetime components such as the capacitor 3. ECU 16 includes a processor 18 and a storage device 20. The processor 18 executes various processes. The various processes include processes related to calculation of the remaining life information described later. The storage device 20 stores various kinds of information necessary for processing by the processor 18. When the processor 18 executes a computer program, various processes by ECU 16 are realized. The computer program is stored in the storage device 20. Alternatively, the computer program may be recorded on a computer-readable recording medium. Note that ECU 16 may be configured by combining a plurality of ECU.

2. Calculation of Remaining Life Information

In the present embodiment, in order to estimate the remaining life of each of the major life components in PCU 1, ECU 16 calculates the remaining life information for each individual life component.

Figure 2:
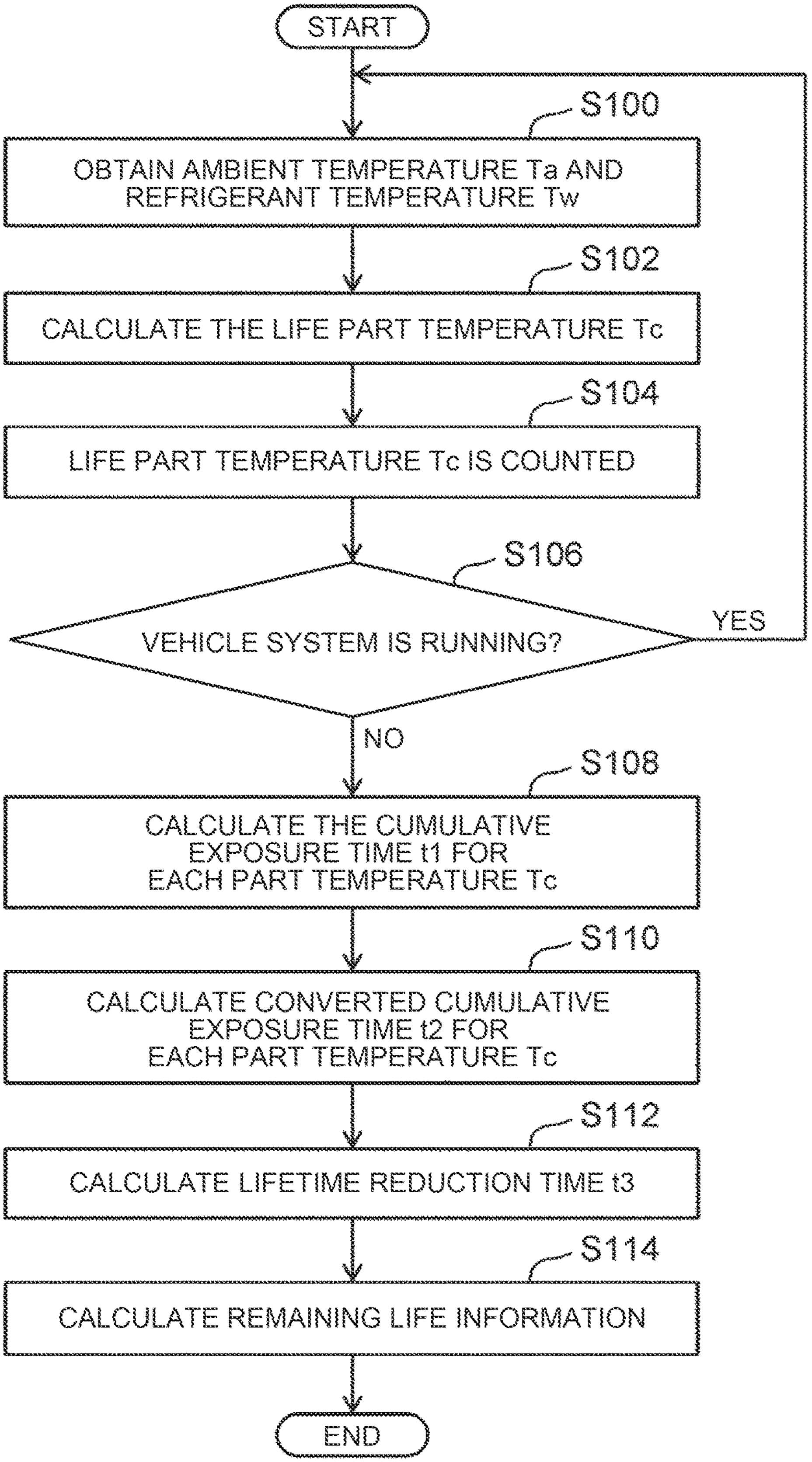
FIG. 2 is a flowchart illustrating an example of processing related to calculation of remaining life information according to the embodiment.

FIG. 2 is a flowchart illustrating an example of a process related to calculation of remaining life information according to the embodiment. The process of this flowchart is started when the vehicle system is activated. The process is performed for each individual lifetime component. That is, the process is executed for each of the capacitor 3, the reactor 4, the control board 5, DC/DC converters 6, and the current sensor 7. FIG. 3 is a table illustrating an example of various data used for calculating the remaining life information. More specifically, the various types of data illustrated in FIG. 3 are stored in the storage device 20 for each lifetime component.

In S100, ECU 16 (processor 18) obtains the ambient temperature Ta and the refrigerant temperature Tw using the ambient temperature sensor 12 and the refrigerant temperature sensor 14, respectively. Thereafter, the process proceeds to S102.

In S102, ECU 16 calculates (estimates) a lifetime component temperature (or simply a part temperature) Tc which is the temperature of the lifetime component to be calculated this time of the remaining lifetime information. The part temperature Tc is calculated based on the ambient temperature Ta, the refrigerant temperature Tw, and the temperature calculation coefficient K1. More specifically, for example, as expressed by the following equation (1), the part temperature Tc is calculated by multiplying the sum of the ambient temperature Ta and the refrigerant temperature Tw by the temperature calculation coefficient K1. The temperature calculation coefficient K1 is determined in advance for each lifetime component as a coefficient corresponding to the sensitivity of the lifetime component to each of the ambient temperature Ta and the refrigerant temperature Tw.

$$Tc = (Ta + Tw) \times K1 \quad (1)$$

Figure 4:
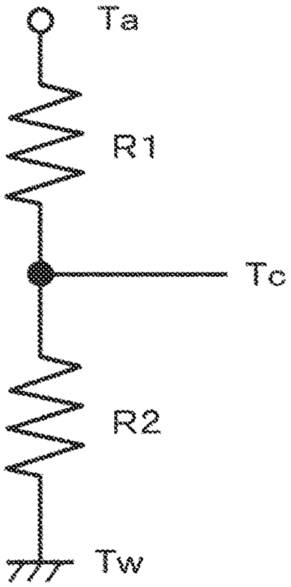
FIG. 4 is a diagram conceptually illustrating a relation between ambient temperature Ta and a life part temperature Tc with respect to a refrigerant temperature Tw.

Specifically, FIG. 4 is a diagram conceptually illustrating a relation between the ambient temperature Ta and the life part temperature Tc with respect to the refrigerant temperature Tw. The part temperature Tc is represented as shown in FIG. 4 using the thermal resistance R1 between the ambient temperature Ta and the part temperature Tc and the thermal resistance R2 between the refrigerant temperature Tw and the part temperature Tc. These thermal resistance R1 and R2 can be specified as design values based on analysis by, for example, CAE (Computer Aided Engineering) or experimental values using an ambient temperature Ta and a refrigerant temperature Tw as parameters. The temperature calculation coefficient K1 for each lifetime component is determined in advance as a value corresponding to the thermal resistance R1 and R2, and is stored in the storage device 20. In addition, in the embodiment shown in FIG. 1, the control board 5 is not a component that is actively cooled by the refrigerant 8, but is influenced by the refrigerant temperature Tw because it is disposed in PCU case 2.

In S102 following S104, ECU 16 counts the part temperature Tc calculated in S102. The count result, that is, the count number (see FIG. 3) is stored in the storage device 20. Then, in S106, ECU 16 determines whether the vehicle-system is running.

If the vehicle-system is running in S106, i.e. if PCU 1 is running, the process returns to S100. That is, the part temperature Tc is calculated and counted repeatedly during the operation of PCU 1. The part temperature Tc is changed during the activation of the vehicle-system. Thus, the calculation and counting of the part temperature Tc are repeated in this manner, so that the counting of the part temperature Tc is performed separately for each part temperature Tc (for example, every 1° C.). In FIG. 3, an exemplary cumulative count value, which is the result of the counting performed in this way, is represented for each part temperature Tc. More specifically, the cumulative value of the count number includes not only the count number during the start-up of the current vehicle system but also the count number during the start-up of the past vehicle system.

In addition, the calculation and counting period (sampling period) ts of the part temperature Tc is, for example, 1 second. The sampling period ts may be constant regardless of the lifetime component, but may be varied depending on the properties of the individual lifetime component. In particular, the manner in which the part temperature Tc changes during operation of PCU 1 may vary depending on the lifetime component. For example, when the heat capacity of the lifetime component is large, the part temperature Tc is less likely to change. Therefore, the sampling period ts used for the life component having a large heat capacity may be set longer than the sampling period ts used for the life component having a small heat capacity. Accordingly, the part temperature Tc can be counted while appropriately suppressing the computational loads of ECU 16 considering the properties of the lifetime component.

On the other hand, if the vehicle-system is not running (S106; No), the process proceeds to S108. In S108, ECU 16 calculates the cumulative exposure-time t1 for each life part temperature Tc. The cumulative exposure time t1 is a cumulative exposure time that is the time at which the lifetime components are exposed to the same temperature. In S108, ECU 16 calculates the cumulative exposure time t1 for each part temperature Tc by multiplying the most recent cumulative value of the counts stored in the storage device 20 by the sampling period ts. That is, the cumulative exposure time t1 is calculated including not only the exposure time during the start-up of the latest vehicle system but also the exposure time during the start-up of the previous vehicle system.

By S108 process, the cumulative exposure-time t1 in the respective part temperatures Tc is updated and stored in the storage device 20. FIG. 3 shows an exemplary cumulative exposure-time t1 updated in this way for each part temperature Tc.

In S110 following S108, ECU 16 calculates (updates) the converted cumulative exposure time t2 for each part temperature Tc. The converted cumulative exposure time t2 corresponds to the cumulative exposure time t1 below the reference value Tcr of the part temperature Tc. An exemplary reference value Tcr is the maximum operating temperature (designed value) of the lifetime component. The converted cumulative exposure time t2 is calculated by reflecting the life conversion coefficient K2 in the cumulative exposure time t1.

Figure 5:
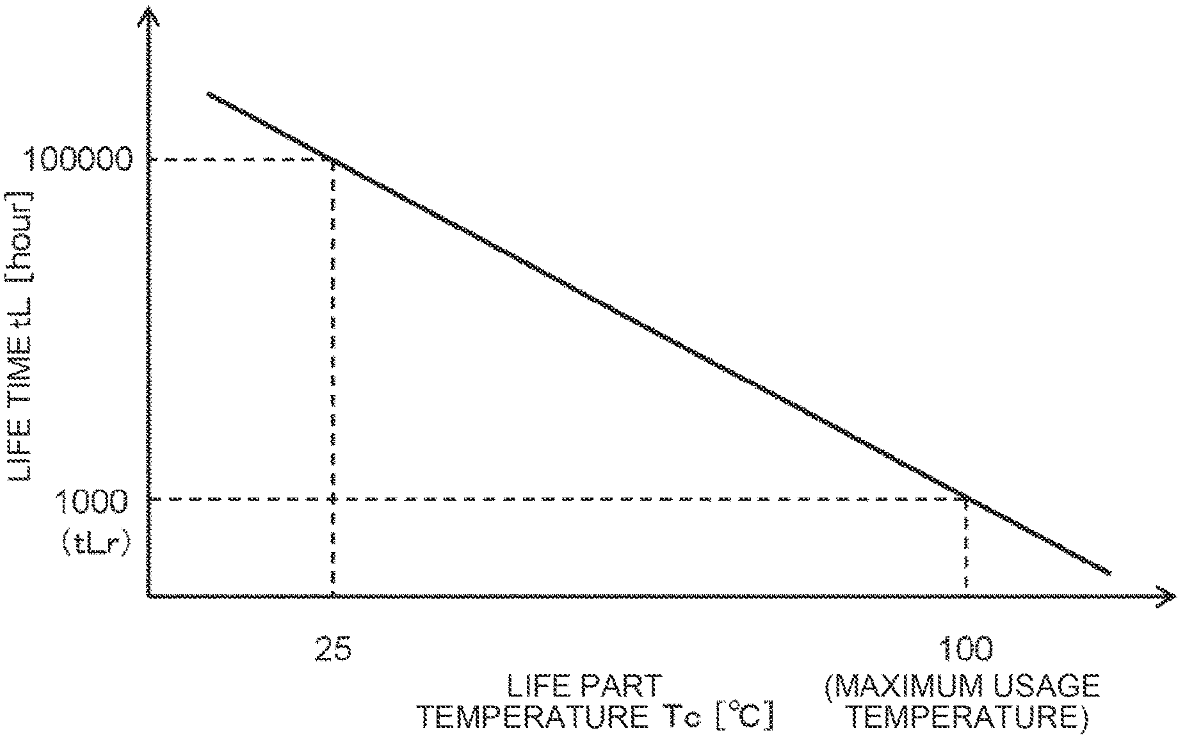
FIG. 5 is a graph illustrating an exemplary property of a life time tL with respect to a life part temperature Tc.

FIG. 5 is a graph illustrating an exemplary property of a life time tL with respect to a life part temperature Tc. The characteristics shown in FIG. 5 correspond to the data of the two columns from the left of the table shown in FIG. 3. Data of the characteristics of the lifetime tL with respect to the part temperature Tc is designed in advance for each lifetime component to be calculated as the remaining lifetime information, and is stored in advance in the storage device 20. In the exemplary property shown in FIG. 5, the reference value Tcr of the part temperature Tc is 100° C., which corresponds to the maximum operating temperature. More specifically, the properties (straight lines) shown in FIG. 5 are identified using two part temperatures Tc (e.g., 25° C. and 100° C.) and a previously measured lifetime tL at these two part temperatures Tc, respectively.

The life conversion coefficient K2 is calculated for each part temperature Tc from the properties as shown in FIG. 5. More specifically, the life conversion coefficient K2 is calculated according to the following equation (2). In Equation (2), tLr is a reference lifetime corresponding to the lifetime tL at the reference value Tcr. For example, for a lifetime component having the properties shown in FIG. 5, the life conversion coefficient K2 when the part temperature Tc is 50° C. is calculated as 0.1 by dividing 1000 hours, which is the reference lifetime tLr, by 10000 hours, which is the lifetime at 50° C. FIG. 3 shows an exemplary life conversion coefficient K2 calculated in this manner for each part temperature Tc. The calculation of the life conversion coefficient K2 is calculated in advance using the part temperature Tc and the life time tL shown in FIG. 3, and is stored in the storage device 20.

$$K2 = tLr/tL \quad (2)$$

Then, when the life conversion coefficient K2 expressed as Equation (2) is used, as expressed in Equation (3) below, the converted cumulative exposure time t2 at each part temperature Tc is calculated by multiplying the cumulative exposure time t1 at each part temperature Tc by the life conversion coefficient K2 at each part temperature Tc. FIG. 3 illustrates an exemplary converted cumulative exposure time t2 calculated in this manner for each part temperature Tc.

$$t2 = t1 \times K2 \quad (3)$$

In S112 following S110, ECU 16 calculates the lifetime-reduction-time t3. The lifetime reduction time t3 corresponds to the sum of the converted cumulative exposure time t2 at the respective part temperatures Tc. In the exemplary table shown in FIG. 3, the sum of the converted cumulative exposure time t2 at the respective part temperatures Tc in the temperature range from 25° C. to 100° C. is calculated as 2.28 hours, which is the life reduction time t3. Thereafter, the process proceeds to S114.

In S114, ECU 16 calculates the remaining life data. The remaining life information is calculated based on the life reduction time t3 calculated by S112 and the reference life time tLr, which is the life time below the reference value Tcr. The calculated remaining life information is stored in the storage device 20.

The remaining life information is calculated, for example, as the remaining life rate X [%] according to the following equation (4). In the exemplary chart shown in FIG. 3, the lifetime reduction time t3 is 2.28 and the reference lifetime tLr is 1000. Therefore, the remaining life rate X is calculated as 99.7% by multiplying the value obtained by subtracting 2.28/1000 from 1 by 100.

$$X = (1 - t3/tLr) \times 100 \quad (4)$$

Further, the remaining life information may be calculated as, for example, the remaining life period, the remaining life time, or the remaining travel distance instead of the remaining life rate X. Specifically, the reference remaining life period (for example, 15 years), which is the usable period of the life component from the time when the life component is a new product (that is, when the remaining life rate X is 100%), is known in advance in terms of design. Therefore, the remaining life period may be calculated by multiplying the reference remaining life period by the remaining life rate X/100. The remaining lifetime may be calculated by subtracting the lifetime reduction time t3 from the reference lifetime tLr. Further, as in the example of the remaining life period, the remaining travel distance may be calculated by multiplying the reference remaining travel distance by the remaining life rate X/100 by using the designed value of the reference remaining travel distance from the time when the life component is a new one.

3. Effect

As described above, according to the remaining life estimation device of the present embodiment, the cumulative exposure-time t1 is calculated for each life part temperature Tc during the operation of PCU 1. Each of the cumulative exposure time t1 calculated for each lifetime component temperature is converted into a converted cumulative exposure time t2, which is the cumulative exposure time beneath the reference value Tcr of the part temperature Tc. Then, the remaining life information is calculated based on the life reduction time t3 which is the sum of the converted cumulative exposure time t2 for each part temperature Tc and the life time tL of the lifetime component below the reference value Tcr. Accordingly, it is possible to appropriately estimate the remaining life of each of the life components constituting PCU 1. Therefore, it is possible to accurately determine the time of repair or replacement of PCU 1 from the remaining life information of the individual life components stored in the storage device 20. Further, the remaining life information stored in the storage device 20 can be suitably used, for example, to determine reuse of PCU 1 collected from discarded vehicles.

Further, according to the present embodiment, the part temperature Tc used for calculating the remaining life information is calculated on the basis of the temperature calculation coefficient K1 corresponding to the ambient temperature Ta, the refrigerant temperature Tw, and the sensitivity of the lifetime component to the ambient temperature Ta and the refrigerant temperature Tw during the operation of PCU 1. According to such a method, it is possible to easily estimate the life part temperature Tc regardless of the number of lifetime components only by acquiring the two temperatures of the ambient temperature Ta and the refrigerant temperature Tw during the operation of PCU 1. Therefore, in comparison with an example in which a dedicated temperature sensor is provided for each lifetime component in order to acquire the part temperature Tc, the number of lifetime components for grasping the remaining lifetime information can be increased while suppressing an increase in the cost required for acquiring the part temperature Tc of each lifetime component.

Further, according to the present embodiment, as the reference life time tLr for calculating the remaining life information, a value measured in advance as the life time tL of the lifetime component at the highest operating temperature as the reference value Tcr is used. In this regard, a measurement of the lifetime tL below any temperature value other than the maximum operating temperature may be used as the reference lifetime tLr. However, the relation between the part temperature Tc and the lifetime tL is not strictly linear as shown schematically in FIG. 5. That is, the rate of change of the lifetime tL with respect to the part temperature Tc may change, for example, in the vicinity of the maximum operating temperature. Therefore, the safety factor needs to be considered for estimating the lifetime tL at the maximum operating temperature when the lifetime tL at the temperature other than the maximum operating temperature is used as the reference lifetime tLr. On the other hand, it is possible to accurately calculate the remaining life information while accurately specifying the life time tL at the maximum use temperature by using the measured value of the life time tL at the maximum use temperature as the reference life time tLr.

What is claimed is:

1. A remaining life estimation device for a power converter including a life part accommodated in a case, the remaining life estimation device comprising:

a memory; and a processor configured to determine whether a vehicle system including the power converter is in an activated state, while a determination is made that the vehicle system is in the activated state, repeatedly, at intervals of a sampling period, calculate a temperature of the life part and count a total number of times the calculated temperature is identified as each life part temperature, in response to a determination that the vehicle system is no longer in the activated state, calculate cumulative exposure times for respective life part temperatures based on the counted total number, each of the cumulative exposure times being a cumulative value of a time for which the life part has been exposed to a corresponding temperature during an operation of the power converter, convert the calculated cumulative exposure times into normalized cumulative exposure times under a reference value of the life part temperature, respectively, by reflecting a life conversion coefficient to each of the calculated cumulative exposure times, calculate the remaining life information based on a life reduction time that is a sum of the normalized cumulative exposure times and a reference life time of the life part under the reference value, and store the calculated remaining life information in the memory, wherein the life part includes a first life part and a second life part, the second life part having a smaller heat capacity than the first life part, a first sampling period for calculating the temperature of the first life part and counting the total number for the first life part is longer than a second sampling period for calculating the temperature of the second life part and counting the total number for the second life part, and the remaining life information is calculated for each of the first life part and the second life part.

2. The remaining life estimation device according to claim 1, further comprising:

an ambient temperature sensor for detecting an ambient temperature in the case; and a refrigerant temperature sensor for detecting a refrigerant temperature of a refrigerant flowing through a flow path in the case, wherein the temperature of the life part is calculated based on the ambient temperature, the refrigerant temperature, and a temperature calculation coefficient corresponding to a sensitivity of the life part to the ambient temperature and the refrigerant temperature during the operation of the power converter.

3. The remaining life estimation device according to claim 1, wherein the reference life time is a value measured in advance as a life time of the life part under a maximum usage temperature as the reference value.

4. The remaining life estimation device according to claim 1, wherein the life part is at least one of a capacitor, a reactor, a control board, a direct current-direct current converter, and a current sensor.

5. The remaining life estimation device according to claim 1, wherein each of the cumulative exposure times is calculated by multiplying the counted total number by the sampling period.

* * * * *